Patented Dec. 1, 1936

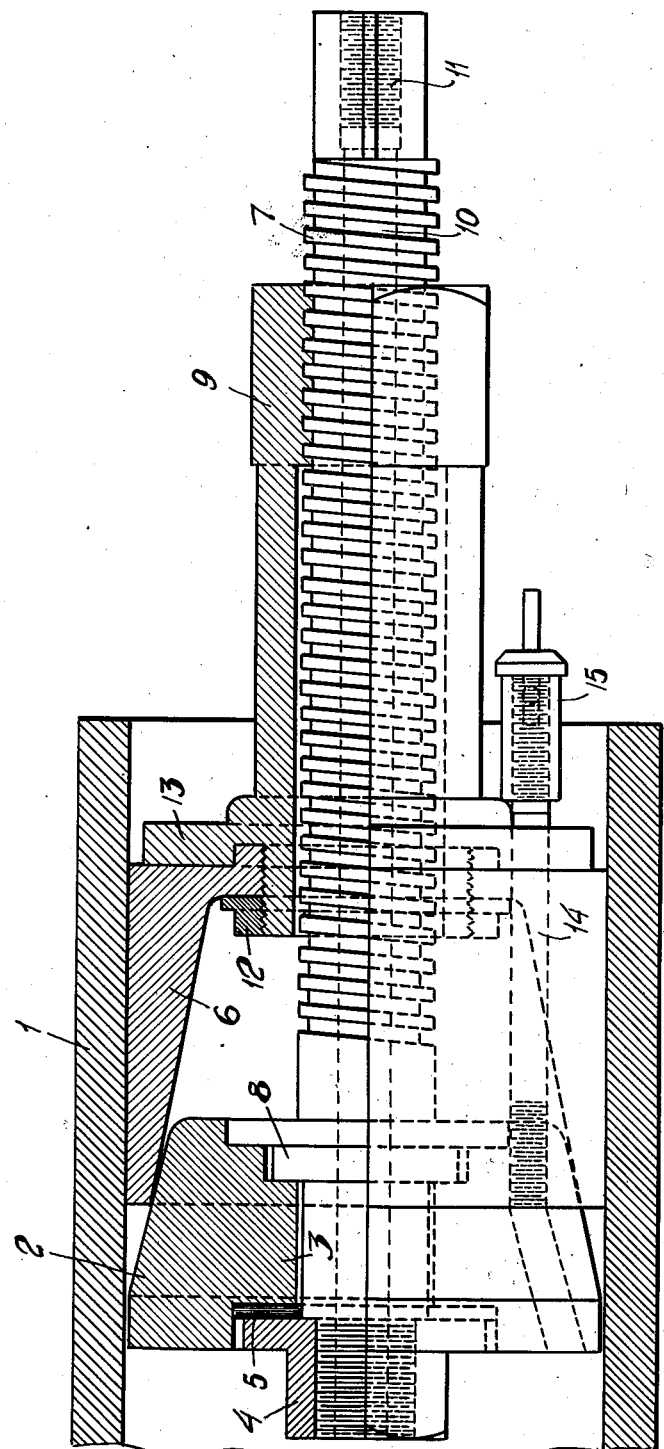

2,062,519

UNITED STATES PATENT OFFICE 2,062,519

TESTING PLUG

Johan Wilhelm Ljungberg, Jonkoping, Sweden

Application March 30, 1935, Serial No. 13,971
In Sweden March 31, 1934

1 Claim. (Cl. 138—90)

The present invention relates to a testing plug for pipes, and is intended to be used for closing the free pipe and to permit testing of the tighteners of a pipe joint. The plug consists of a conical pressing member and a tightening cap of rubber or similar resilient material, said cap by moving the pressing member in axial direction being pressed against the inner surface of the pipe with a tight fit. Extending through the pressing member and the tightening cap is a screw provided with a channel for admitting the pressure fluid, said screw supporting the pressing member.

The characteristic feature of the invention consists therein that the screw engages a nut provided with an extension, which is adapted to support the tightening cap and to enter the pipe. The outer end of the screw normally protruding through the nut is provided with means for turning the screw.

The accompanying drawing illustrates a side view partly in axial section of an embodiment of the invention.

1 is the end of a pipe which is to be closed for testing. The plug for closing the said pipe end has a conical member 2 which is mounted on a screw 7, said screw being provided with a collar 8 engaging the outer surface of a shoulder 3 on the member 2. A nut 4 is screwed onto the inner end of the screw 7, said nut by means of a leather packing 5 pressing against the inner surface of the shoulder 3. The top end of the conical member 2 extends into a cap 6 of rubber or similar resilient tightening material, the inner surface of the cap 6 tapering in substantial correspondence with the conical surface of the member 2. The cap 6 is screwed onto the extension of a nut 9 engaging the screw 7 and is clasped between a nut 12 screwed on the inner end of said extension and a collar 13 formed on this extension.

The screw 7 is provided with an axially extending channel 10 which at the outer end forms a screw threaded hole 11, into which a supply pipe may be screwed. Furthermore, the outer end of the screw 7 is adapted to be engaged by a key for turning the screw.

For testing the apparatus is inserted into the pipe 1 and the screw 7 is turned so as to cause the member 2 to be drawn inwards into the tightening cap 6 and to press the wall of the latter against the inner surface of the pipe 1. After that the testing fluid, normally water under pressure, is admitted through the supply pipe and the channel 10 causing air to escape through a channel 14 provided with a non-return valve 15. When the testing is performed the screw 7 is turned so as to cause the member 2 to move in the direction from the cap 6, thereby causing said cap to be disengaged from the wall of the pipe 1.

The apparatus may now easily be removed from the pipe.

What I claim is:—

A pipe testing plug for closing a pipe in order to test the tighteners of a pipe joint, consisting of a conical pressing member, a tightening cap of resilient material having a conical inner surface, said cap being pressed against the inner surface of the pipe with a tight fit when the pressing member is forced axially into the cap and presses against the inner wall thereof, a screw extending through the tightening cap, means swivelly supporting the pressing member on the screw, a nut engaging said screw and provided with an extension, a collar formed on the inner end of the extension, means cooperating with said collar for securing said tightening cap to said extension, the outer end of said screw normally protruding through the nut being provided with means for turning the screw.

JOHAN WILHELM LJUNGBERG.